(12) United States Patent
Nakashima et al.

(10) Patent No.: US 11,062,475 B2
(45) Date of Patent: Jul. 13, 2021

(54) LOCATION ESTIMATING APPARATUS AND METHOD, LEARNING APPARATUS AND METHOD, AND COMPUTER PROGRAM PRODUCTS

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Ryo Nakashima, Kawasaki Kanagawa (JP); Tomoki Watanabe, Inagi Tokyo (JP); Akihito Seki, Yokohama Kanagawa (JP); Yusuke Tazoe, Kokubunji Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 247 days.

(21) Appl. No.: 16/291,493

(22) Filed: Mar. 4, 2019

(65) Prior Publication Data

US 2020/0013188 A1 Jan. 9, 2020

(30) Foreign Application Priority Data

Jul. 4, 2018 (JP) .............................. JP2018-127460

(51) Int. Cl.
*G06K 9/00* (2006.01)
*G06T 7/73* (2017.01)
(Continued)

(52) U.S. Cl.
CPC ............. *G06T 7/74* (2017.01); *G06N 3/0454* (2013.01); *G06N 20/00* (2019.01); *G06T 2207/30244* (2013.01)

(58) Field of Classification Search
CPC ............. G06T 7/74; G06T 2207/30244; G06T 2207/20081; G06N 3/0454; G06N 20/00; G06N 3/08
(Continued)

(56) References Cited

U.S. PATENT DOCUMENTS

2018/0253861 A1* 9/2018 Moteki ................. G06T 19/006

FOREIGN PATENT DOCUMENTS

JP 2017-021427 1/2017
JP 2019-032751 2/2019

OTHER PUBLICATIONS

Arandjelović, R., Gronat, P., Torii, A., Pajdla, T., Sivic, J.: NetVLAD: CNN architecture for weakly supervised place recognition. In: IEEE Conference on Computer Vision and Pattern Recognition (CVPR). (2016) 1437-1451.
(Continued)

*Primary Examiner* — Andrew M Moyer
(74) *Attorney, Agent, or Firm* — Knobbe, Martens, Olson & Bear, LLP

(57) ABSTRACT

A location estimating apparatus according to an embodiment includes a degree-of-similarity calculator, a correspondence calculator, and a location calculator. The degree-of-similarity calculator calculates a degree of similarity between the input image and the reference image by an arithmetic operation that varies, in a non-discrete manner, the degree of similarity in accordance with a non-discrete variation of a first parameter. The correspondence calculator calculates correspondence between a pixel of the input image and a pixel of the reference image by an arithmetic operation that varies, in a non-discrete manner, the correspondence in accordance with a non-discrete variation of a second parameter. The location calculator calculates a first location indicating a position and/or an orientation of the first imaging
(Continued)

device when the input image is captured by an arithmetic operation that varies, in a non-discrete manner, the first location in accordance with a non-discrete variation of the correspondence.

23 Claims, 9 Drawing Sheets

(51) Int. Cl.
  *G06N 20/00* (2019.01)
  *G06N 3/04* (2006.01)
(58) Field of Classification Search
  USPC .................................................. 382/103–107
  See application file for complete search history.

(56) References Cited

OTHER PUBLICATIONS

Bentley, J.L.: Multidimensional binary search trees used for associative searching. Commun. ACM 18 (1975) 509-517.
Brachmann, E., Krull, A., Nowozin, S., Shotton, J., Michel, F., Gumhold, S., Rother, C.: DSAC—Differentiable RANSAC for camera localization. In: IEEE Conference on Computer Vision and Pattern Recognition (CVPR). (2017) 2492-2500.
Brachmann, E., Rother, C.: Learning less is more | 6D camera localization via 3D surface regression. In: IEEE Conference on Computer Vision and Pattern Recognition (CVPR). (2018).
Dosovitskiy, A., Fischer, P., Ilg, E., Häusser, P., Hazirbas, C., Golkov, V., v.d. Smagt, P., Cremers, D., Brox, T.: FlowNet: learning optical flow with convolutional networks. In: IEEE International Conference on Computer Vision (ICCV). (2015) 2758-2766.
Ilg, E., Mayer, N., Saikia, T., Keuper, M., Dosovitskiy, A., Brox, T.: FlowNet 2.0: Evolution of optical flow estimation with deep networks. In: IEEE Conference on Computer Vision and Pattern Recognition (CVPR). (2017) 1647-1655.
Kendall, A., Cipolla, R.: Geometric loss functions for camera pose regression with deep learning. In: IEEE Conference on Computer Vision and Pattern Recognition (CVPR). (2017) 6555-6564.
Kendall, A., Cipolla, R.: Modelling uncertainty in deep learning for camera relocalization. In: IEEE International Conference on Robotics and Automation (ICRA). (2016) 4762-4769.
Kendall, A., Grimes, M., Cipolla, R.: PoseNet: A convolutional network for real-time 6-DoF camera relocalization. In: IEEE International Conference on Computer Vision (ICCV). (2015) 2938-2946.
Kendall, A., Martirosyan, H., Dasgupta, S., Henry, P.: End-to-end learning of geometry and context for deep stereo regression. In: IEEE International Conference on Computer Vision (ICCV). (2017) 66-75.
Laskar, Z., Melekhov, I., Kalia, S., Kannala, J.: Camera relocalization by computing pairwise relative poses using convolutional neural network. In: IEEE International Conference on Computer Vision Workshops (ICCVW). (2017).
Lepetit, V., F.Moreno-Noguer, P.Fua: EPnP: an accurate O(n) solution to the PnP problem. International Journal Computer Vision 81 (2009) 155.
Li, X., Ylioinas, J., Kannala, J.: Full-Frame Scene Coordinate Regression for Image-Based Localization. ArXiv Preprint ArXiv:1802.03237 (2018).
Li, Y., Snavely, N., Huttenlocher, D., Fua, P.: Worldwide pose estimation using 3D point clouds. In: European Conference on Computer Vision (ECCV). (2012) 15-29.
Lowe, D.G.: Distinctive image features from scale-invariant keypoints. International Journal of Computer Vision 60 (2004) 91-110.
Mur-Artal, R., Tardós, J.D.: Fast relocalisation and loop closing in keyframe-based SLAM. In: IEEE International Conference on Robotics and Automation (ICRA). (2014) 846-853.
Noha Radwan, A.V., Burgard, W.: VLocNet++: Deep multitask learning for semantic visual localization and odometry. ArXiv Preprint ArXiv:1804.08366 (2018).
Radenović, F., Tolias, G., Chum, O.: Fine-tuning CNN image retrieval with no human annotation. IEEE Transactions on Pattern Analysis and Machine Intelligence (2018) 1-1.
Ranjan, A., Black, M.J.: Optical flow estimation using a spatial pyramid network. In: IEEE Conference on Computer Vision and Pattern Recognition (CVPR). (2017) 2720-2729.
Sattler, T., Leibe, B., Kobbelt, L.: Efficient & effective prioritized matching for large-scale image-based localization. IEEE Transactions on Pattern Analysis and Machine Intelligence 39 (2017) 1744-1756.
Sattler, T., Torii, A., Sivic, J., Pollefeys, M., Taira, H., Okutomi, M., Pajdla, T.: Are Large-Scale 3D Models Really Necessary for Accurate Visual Localization?, In: IEEE Conference on Computer Vision and Pattern Recognition (CVPR). (2017).
Shotton, J., Glocker, B., Zach, C., Izadi, S., Criminisi, A., Fitzgibbon, A.: Scene coordinate regression forests for camera relocalization in RGB-D images. In: IEEE Conference on Computer Vision and Pattern Recognition (CVPR), IEEE (2013) 2930-2937.
Sun, D., Yang, X., Liu, M.Y., Kautz, J.: PWC-Net: CNNs for optical flow using pyramid, warping, and cost volume. (2018).
Svärm, L., Enqvist, O., Kahl, F., Oskarsson, M.: City-scale localization for cameras with known vertical direction. IEEE Transactions on Pattern Analysis and Machine Intelligence 39 (2017) 1455-1461.
Taira, H., Okutomi, M., Sattler, T., Cimpoi, M., Pollefeys, M., Sivic, J., Pajdla, T., Torii, A.: Inloc: Indoor visual localization with dense matching and view synthesis. In: IEEE Conference on Computer Vision and Pattern Recognition (CVPR). (2018).
Valada, A., Radwan, N., Burgard, W.: Deep auxiliary learning for visual localization and odometry. In: IEEE International Conference on Robotics and Automation (ICRA). (2018).
Walch, F., Hazirbas, C., Leal-Taixe, L., Sattler, T., Hilsenbeck, S., Cremers, D.: Image-based localization using LSTMs for structured feature correlation. In: IEEE International Conference on Computer Vision (ICCV). (2017) 627-637.
Zeisl, B., Sattler, T., Pollefeys, M.: Camera pose voting for large-scale image-based localization. In: IEEE International Conference on Computer Vision (ICCV). (2015) 2704-2712.

\* cited by examiner

LOCATION ESTIMATING APPARATUS AND METHOD, LEARNING APPARATUS AND METHOD, AND COMPUTER PROGRAM PRODUCTS

CROSS-REFERENCE TO RELATED APPLICATIONS

This application is based upon and claims the benefit of priority from Japanese Patent Application No. 2018-127460, filed on Jul. 4, 2018, the entire contents of which are incorporated herein by reference.

FIELD

Embodiments described herein relate generally to a location estimating apparatus and method, a learning apparatus and method, and computer program products.

BACKGROUND

Techniques for estimating a location of a camera represented by a position and an orientation of the camera at the time of imaging from an image captured by a camera or the like have been conventionally known.

However, with the conventional technique, it has been difficult to further improve the estimation accuracy of the location of the camera at the time of imaging.

DETAILED DESCRIPTION

Figure 1:
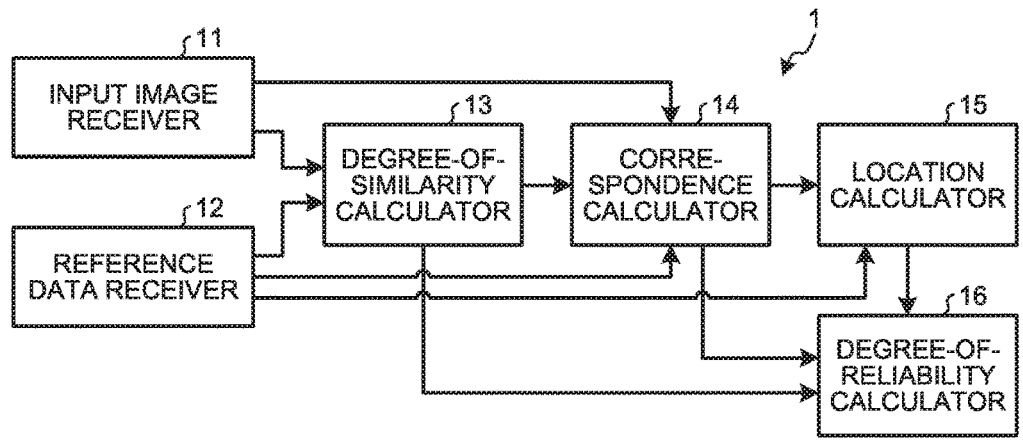
FIG. 1 is a diagram illustrating an example of a functional configuration of a location estimating apparatus according to a first embodiment.

According to an embodiment, a location estimating apparatus includes a degree-of-similarity calculator implemented by one or more hardware processors, a correspondence calculator implemented by one or more hardware processors, and a location calculator implemented by one or more hardware processors. The degree-of-similarity calculator calculates a degree of similarity between the input image and the reference image by an arithmetic operation that varies, in a non-discrete manner, the degree of similarity in accordance with a non-discrete variation of a first parameter. The correspondence calculator calculates correspondence between a pixel of the input image and a pixel of the reference image by an arithmetic operation that varies, in a non-discrete manner, the correspondence in accordance with a non-discrete variation of a second parameter. The location calculator calculates, by using the reference data, a first location indicating a position and/or an orientation of the first imaging device when the input image is captured by an arithmetic operation that varies, in a non-discrete manner, the first location in accordance with a non-discrete variation of the correspondence.

Embodiments of a location estimating apparatus and method, a learning apparatus and method, and computer program products will be described in detail below with reference to the accompanying drawings.

First Embodiment

A location estimating apparatus 1 according to a first embodiment is configured to estimate, from an image captured by an imaging device such as a camera, a location indicating at least one of a position and an orientation of the imaging device when the image is captured. The location estimating apparatus 1 is used for a mobile body such as an automobile and a mobile robot.

Overview of Location Estimating Apparatus

The location estimating apparatus 1 according to the first embodiment is configured to search for a reference image similar to an input image from a database storing images whose imaging positions are known, obtain a correspondence between a searched reference image and the input image, and estimate a location and a degree of reliability of the location from geometric relationship of the obtained correspondence. Location estimation processing performed by the location estimating apparatus 1 according to the first embodiment is implemented by a combination of non-discrete (continuous) arithmetic operations. The non-discrete (continuous) arithmetic operations refer to variation in resulting outputs of an arithmetic operation when a parameter (the input image, the reference image, an imaging condition, and a variable of arithmetic processing or the like) that influences the arithmetic operation result is varied in a non-discrete manner. With the location estimating apparatus 1 according to the first embodiment, by gradually varying the parameter, it is possible to make the location and the degree of reliability to be output close to desired values.

First, an example of a functional configuration of a location estimating apparatus 1 according to the first embodiment will be described.

Example of Functional Configuration

FIG. 1 is a diagram illustrating the example of the functional configuration of the location estimating apparatus 1 according to the first embodiment. The location estimating apparatus 1 according to the first embodiment includes an input image receiver 11, a reference data receiver 12, a degree-of-similarity calculator 13, a correspondence calculator 14, a location calculator 15, and a degree-of-reliability calculator 16.

The input image receiver 11 is configured to receive an input image captured by a first imaging device attached to a mobile body.

The reference data receiver 12 is configured to receive reference data in which a reference image captured by a second imaging device is associated with a position and an orientation of the second imaging device when the reference image is captured.

The degree-of-similarity calculator 13 is configured to calculate a degree of similarity between the input image and the reference image by an arithmetic operation that varies, in a non-discrete manner, the degree of similarity in accordance with non-discrete variations of a first parameter. Details of calculation processing of the degree of similarity will be described later.

The correspondence calculator 14 is configured to calculate correspondence between a pixel of the input image and a pixel of the reference image by an arithmetic operation that varies, in a non-discrete manner, the correspondence in accordance with non-discrete variations of a second parameter. Details of calculation processing of the correspondence will be described later.

The location calculator 15 is configured to calculate a first location indicating at least one of a position and an orientation of the first imaging device when the input image is captured by an arithmetic operation that varies, in a non-discrete manner, the first location in accordance with non-discrete variations of the correspondence calculated by the correspondence calculator 14. Details of calculation processing of the first location will be described later.

The degree-of-reliability calculator 16 is configured to calculate the degree of reliability of the first location by an arithmetic operation that varies, in a non-discrete manner, the degree of reliability in accordance with a non-discrete variations of the first location calculated by the location calculator 15, the correspondence calculated by the correspondence calculator 14, and the degree of similarity calculated by the degree-of-similarity calculator 13. Details of calculation processing of the degree of reliability will be described later.

Next, an example of the location estimation processing according to the first embodiment will be described with reference to a flowchart.

Example of Location Estimation Processing

Figure 2:
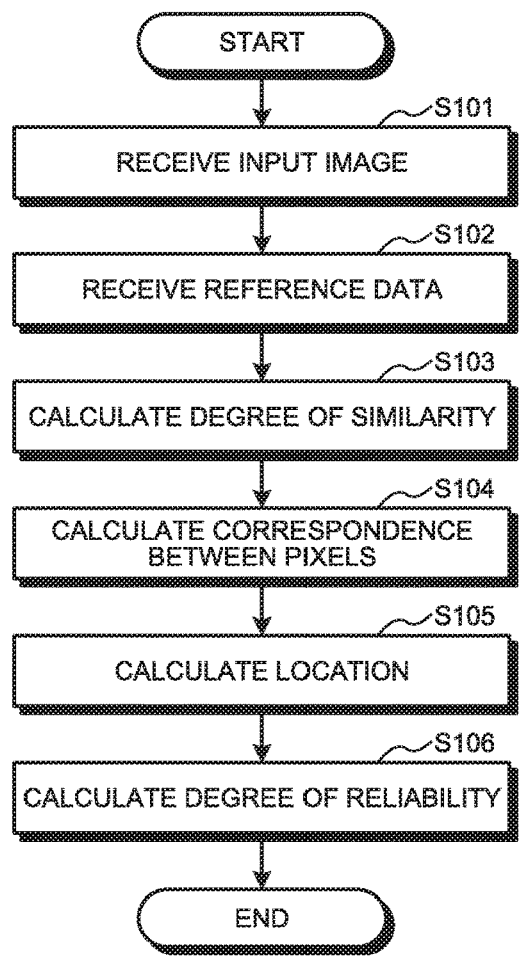
FIG. 2 is a flowchart illustrating an example of location estimation processing according to the first embodiment.

FIG. 2 is a flowchart illustrating an example of the location estimation processing according to the first embodiment. Note that the detailed description of each step will be described later. First, the input image receiver 11 receives the input image from the first imaging device mounted on the mobile body (S101).

Next, the reference data receiver 12 receives the above-described reference data (S102).

Next, the degree-of-similarity calculator 13 calculates the degree of similarity between the input image and the reference image by the continuous arithmetic operations using the first parameter (S103). The first parameter includes, for example, input data (the input image and the reference image) and a variable defining a criterion for calculating the degree of similarity (a method of calculating the degree of similarity). The variable defining a criteria for calculating the degree of similarity is, for example, a weight of a neural network that calculates the degree of similarity.

Next, the correspondence calculator 14 calculates the correspondence between the pixel of the input image and the pixel of the reference image by the continuous arithmetic operations using the second parameter (S104). The second parameter includes, for example, the input data (the input image and the reference image) and a variable defining a criterion for association (an association method). The variable defining the criterion for association is, for example, a weight of a neural network that calculates the correspondence between a pixel of the input image and a pixel of the reference image.

Next, from a geometrical relationship of the correspondence calculated by the processing of step S104, the location calculator 15 calculates the first location indicating at least one of the position and the orientation of the camera when the input image is captured (S105).

Next, the degree-of-reliability calculator 16 calculates the degree of reliability of the location calculated (estimated) by the location calculator 15 from the degree of similarity between the input image and the reference image and the correspondence between the pixel of the input image and the pixel of the reference image (S106).

Next, details of each step of FIG. 2 will be described.
Step S101
Step S101 is the same as described above.
Step S102
The reference data receiver 12 receives the above-described reference data from a database configured to hold the reference image and the position and the orientation of the second imaging device that captured the reference image in association with each other. Note that the position and the orientation of the second imaging device are expressed, for example, under a reference coordinate system common to all the reference images. Specifically, as a way of selecting the reference coordinate system, a global coordinate system represented by latitude and longitude may be used, or a coordinate system with a specific imaging position of the reference image set as an origin point may be used.

Figure 3:
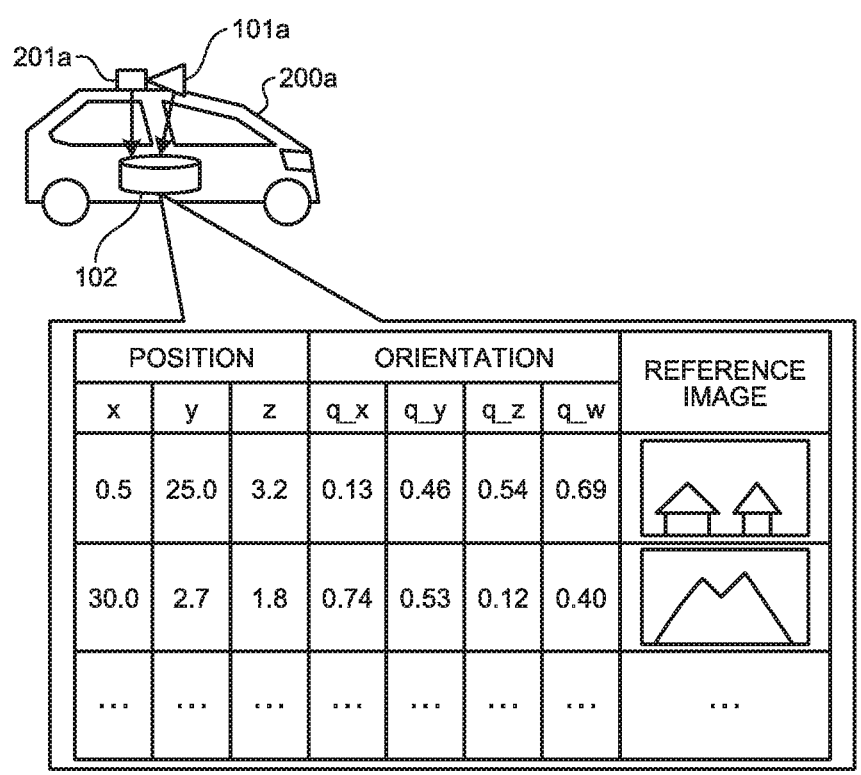
FIG. 3 is a diagram illustrating an example of a database configured to store reference data according to the first embodiment.

FIG. 3 is a diagram illustrating an example of a database 102 configured to store the reference data according to the first embodiment. In the example of FIG. 3, a mobile body 200a includes a camera 101a (the second imaging device), a sensor 201a, and the database 102. The camera 101a is configured to acquire the reference image. The sensor 201a is configured to acquire a position and an orientation of the camera 101a. The database 102 is configured to store the reference image at the same time and sensor data indicating the position and the orientation acquired by the sensor 201 in association with each other.

Here, the sensor 201a is a positioning system such as a global positioning system (GPS) and a global navigation satellite system (GNSS). Furthermore, the sensor 201*a* is an inertial sensor such as an inertial measurement unit (IMU).

Note that in FIG. 3, a position in a three-dimensional space is expressed by coordinates (x, y, z) in the three-dimensional space, and an orientation in the three-dimensional space is expressed by a combination of quaternions representing rotations in the three-dimensional space (q_x, q_y, q_z, q_w). However, it is possible to apply the location estimating apparatus 1 according to the first embodiment to any method of expressing the position and the orientation represented by any degree of freedom.

For example, assuming that a movement is performed on a plane such as the case of a movement on a floor surface, the position and the orientation can be expressed with three degrees of freedom obtained by combining two degrees of freedom regarding translation with one degree of freedom regarding rotation. Furthermore, for example, in order to express the orientation in the three-dimensional space, a rotation matrix, a vector representing a rotation axis and a rotation angle and an Euler angle or the like may be used instead of the quaternions.

Furthermore, as another configuration method of the database 102, by applying structure from motion (SfM) a plurality of images acquired by the camera 101*a*, the position and the orientation of the camera when each image is captured may be estimated. Furthermore, as another configuration method of the database 102, by acquiring the reference image while the mobile body 200*a* is moved and applying simultaneous localization and mapping (SLAM) to the acquired reference image, the position and the orientation of the camera 101*a* when the reference image is captured may be estimated.

The reference data receiver 12 may receive all sets of the reference image and the position and the orientation in the database 102 or may receive a part of the sets of the reference image and the position and the orientation in the database 102. For example, when there is the database 102 that stores captured images of the inside of a building having a plurality of floors, the whole of the database 102 may be used for the location estimation. In a case where prior information about a floor on which the mobile body 200*a*, such as a mobile robot, is present or about a room in which the mobile body 200*a* is present can be obtained, the reference data receiver 12 may receive only a set of the reference image and the position and the orientation close to a specific floor, room or the like on the basis of the prior information.

Step S103

Details of step S103 (the calculation processing of the degree of similarity) will be described with reference to FIGS. 4 and 5.

Figure 4:
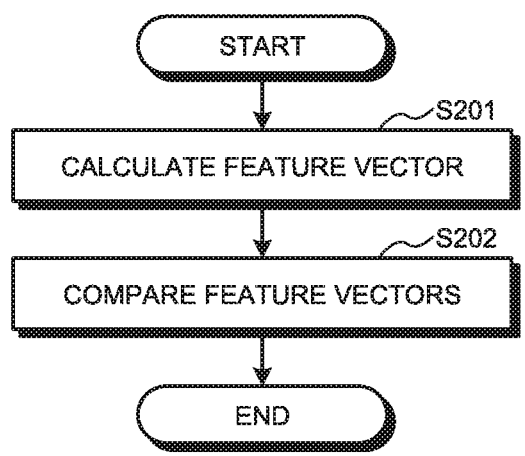
FIG. 4 is a flowchart illustrating an example of calculation processing of a degree of similarity according to the first embodiment.
Figure 5:
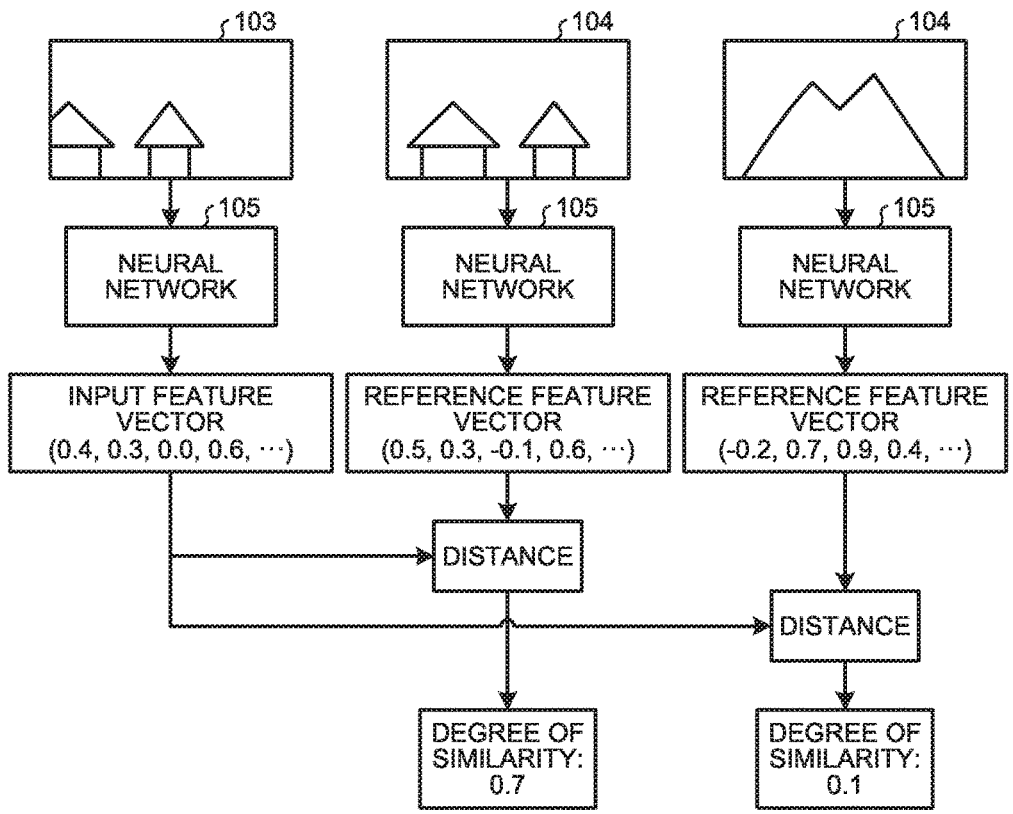
FIG. 5 is a diagram illustrating an example of the calculation processing of the degree of similarity according to the first embodiment.

FIG. 4 is a flowchart illustrating an example of the calculation processing of the degree of similarity according to the first embodiment. FIG. 5 is a diagram illustrating an example of the calculation processing of the degree of similarity according to the first embodiment.

First, the degree-of-similarity calculator 13 calculates an input feature vector from the input image 103 using a neural network 105 and calculates a reference feature vector from the reference image 104 (step S201). Next, the degree-of-similarity calculator 13 calculates the degree of similarity to be higher as the input feature vector and the reference feature vector are more similar to each other (step S202).

Note that the degree of similarity represents, for example, the degree at which the input image 103 and the reference image 104 sharing useful clues for estimating the location of the first imaging device. Specifically, in a case where the location of the first imaging device is estimated in an urban area, since buildings, signs, and signals or the like do not change even if time differs, those can be useful clues for estimating the location. Meanwhile, since pedestrians and vehicles, and the like moves, the pedestrians and vehicles are not useful clues for the location estimation. Therefore, it is possible to use, as the degree of similarity, a value that is obtained by adjusting the calculation processing of the feature vector to exclude objects, such as the pedestrians and vehicles, which are not useful clues for the location estimation. Furthermore, in general, when the appearances of the input image 103 and the reference image 104 are close to each other, there is also a high possibility of sharing useful clues for the location estimation. Therefore, the appearances of the input image 103 and the reference image 104 are simply expressed as feature vectors, and the degree of similarity may be defined based on a comparison between the feature vectors.

Next, details of steps S201 and S202 will be described with reference to FIG. 5.

Step S201

The feature vector of the image is calculated by applying a feature extractor capable of continuously changing operation by the first parameter to the image. For example, in FIG. 5, the neural network 105 using the images as input is used as the feature extractor. As a parameter of the neural network 105, a parameter obtained in advance in learning related to tasks such as image search and object recognition may be used, or a parameter learned in advance by an auto-encoder or the like may be used. Since the neural network 105 is achieved by a combination of non-discrete (continuous) functions, the neural network 105 can be used for the feature extractor according to the present embodiment.

For example, a feature extractor may be used, which is configured to express the images (the input image 103 and the reference image 104) as a linear combination of a predetermined basis and uses a coefficient of the linear combination as a feature. As the basis, an analytically defined function such as a wavelet transformation and a discrete cosine transformation may be used, or a basis function learned from the image may be used. Also at this time, since the coefficient of the linear combination can be obtained by a combination of the non-discrete (continuous) arithmetic operations, a non-discrete (continuous) feature extractors can be also achieved by using this method.

For example, a plurality of patches (divided images) may be obtained by dividing the input image 103, and a plurality of feature vectors obtained by applying the feature extractor to each patch may be combined. In this case, the input image 103 itself is also considered as a type of patch. When the plurality of feature vectors is combined, the feature vectors may be concatenated, and a representative value that is, a sum, an average, a maximum value or the like of corresponding elements may be used.

In addition, for example, principal component analysis (PCA) and linear discriminant analysis (LDA) may be applied to the vector obtained by the feature extractor and continuous dimensional reduction may be applied to the input.

Note that in a case where the reference image 104 is obtained before the input image 103 is obtained, the reference feature vector may be calculated in advance for the reference image 104 stored in the database 102. That is, the reference vector in association with the reference image 104 may be stored in advance in the database 102.

Furthermore, the degree-of-similarity calculator 13 may calculate in advance a structure such as a k-dimensional (KD) tree and a hash such as locality sensitive hashing (LSH) such that the reference image 104 similar to the input image 103 can be calculated at a higher speed from the reference feature vector calculated in advance.

Step S202

The degree-of-similarity calculator 13 further calculates the degree of similarity by comparing the input feature vector and the reference feature vector by the continuous arithmetic operations. For example, in FIG. 5, a Euclidean distance between vectors is used as a basis for comparison. Note that as the continuous arithmetic operations used as the basis for comparison, arithmetic operations of calculating a Mahalanobis distance, an inner product of vectors, an angle formed by vectors, or the like may be used.

Step S104

Figure 6:
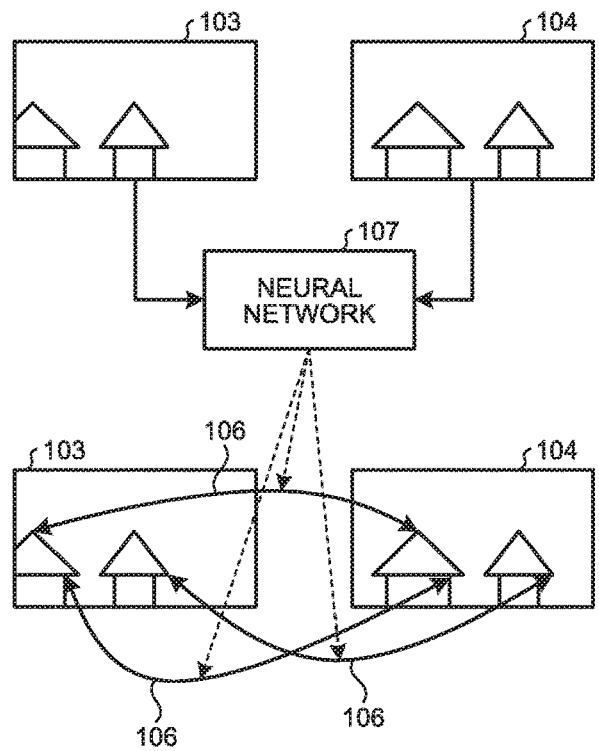
FIG. 6 is a diagram illustrating an example of calculation processing of correspondence according to the first embodiment.

The correspondence calculator 14 calculates the correspondence 106 between the input image 103 and the reference image 104 by the continuous arithmetic operations, for example, as illustrated in FIG. 6.

FIG. 6 is a flowchart illustrating an example of the calculation processing of the correspondence 106 according to the first embodiment. In FIG. 6, the correspondence 106 is illustrated only for some pixels, but the correspondence 106 may be calculated for all the pixels of the input image 103 or for all the pixels of the reference image 104.

The correspondence calculator 14 calculates the correspondence 106 using a neural network 107, for example, as illustrated in FIG. 6. When the neural network 107 receives the input image 103 and the reference image 104, the neural network 107 is configured to return the coordinates of a corresponding point of the reference image 104 for each pixel of the input image 103. As described above, since the neural network is achieved by a combination of the continuous arithmetic operations, the neural network can be used for the correspondence calculator 14 according to the present embodiment. As the neural network 107, a neural network learned in advance for tasks such as an optical flow can be used. Furthermore, the neural network 107 may share a part of layers and parameters of the layers with the neural network 105 used in the degree-of-similarity calculator 13.

Note that as for the input of the neural network 107 for obtaining the coordinates of the corresponding point, for example, the whole of the input image 103 may be used as the input. Furthermore, for example, the correspondence calculator 14 may divide each of the input image 103 and the reference image 104 into patches (divided images) and independently input each patch to the neural network 107.

Furthermore, in order to reduce a calculation amount, the correspondence calculator 14 may obtain, from the input image 103, the correspondence 106 between the pixels at a resolution lower than a resolution of the input image 103. Furthermore, when the correspondence calculator 14 calculates the correspondence 106, the correspondence calculator 14 may calculate an evaluation value for determining whether the correspondence 106 is correct.

Step S105

The location calculator 15 calculates the first location from a correspondence relationship between the input image 103 and the reference image 104. As an example of a method of calculating the first location, a method of minimizing a reprojection error can be used.

Specifically, the location calculator 15 calculates a position in a space corresponding to a pixel of the input image 103 by using a position in a space corresponding to a pixel of the reference image 104 identified by the reference data and a correspondence between the pixel of the input image 103 and the pixel of the reference image 104. Then, the location calculator 15 calculates the first location such that a pixel distance indicating a distance between a point of the input image 103 associated with the position in the space on the basis of the first location and the pixel of the input image 103 corresponding to the pixel of the reference image 104 used for calculating the position in the space is minimized. Details of a method of minimizing the reprojection error (the above-described pixel distance) and calculating the first location will be described with reference to FIG. 7.

Figure 7:
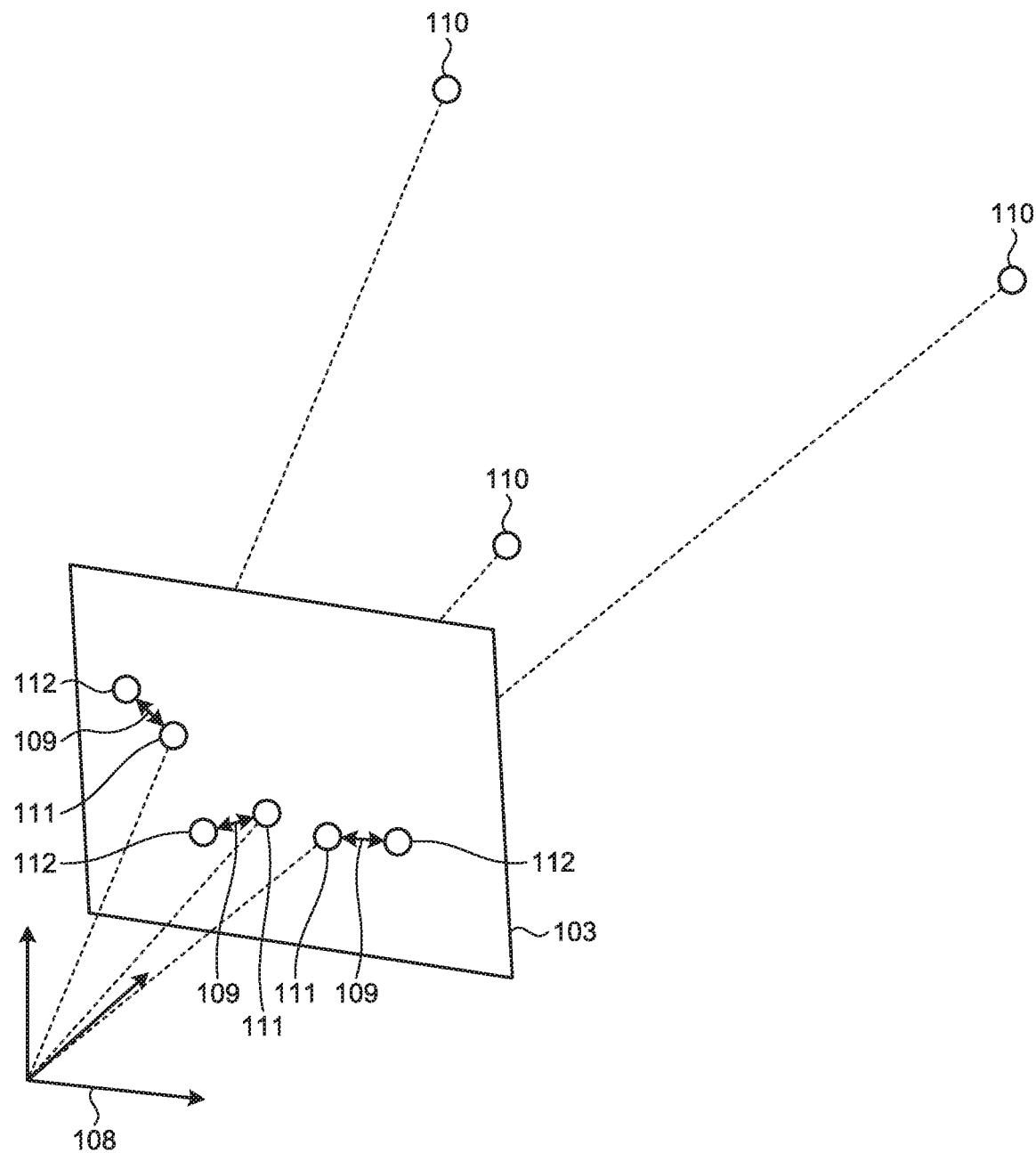
FIG. 7 is a diagram illustrating an example of calculation processing of a first location according to the first embodiment.

FIG. 7 is a flowchart illustrating an example of the calculation processing of the first location 108 according to the first embodiment. As illustrated in FIG. 7, a reprojection error 109 represents a difference between a pixel position 111 on an image at which a point of a position 110 in a space corresponding to a pixel 112 of an input image 103 is supposed to be imaged when a position of a first location 108 is assumed and the pixel 112 of the input image.

The reprojection error 109 can be formulated by the following equation (1).

$$E = \sum_i \|p_i - \pi(P_i, T)\|^2 \tag{1}$$

Here, $p_i$ represents the pixel 112 of the input image 103. $P_i$ represents the position 110 of the point in the space corresponding to a pixel $p_i$. $P_i$ is represented in the reference coordinate system. $P_i$ can be obtained from the correspondence 106 between the input image 103 and the reference image 104. A specific way of obtaining $p_i$ and $P_i$ will be described later.

Furthermore, T represents the first location 108 indicating the position of the camera that captured the input image 103. $\pi(P_i, T)$ represents the pixel position 111 on the input image 103 at which a position $P_i$ is imaged when the position of the first location 108 is assumed to be T. $\pi(P_i, T)$ can be obtained from internal parameters including a focal length, a distortion coefficient, and the like of the camera that captured the input image 103.

Here, a method of obtaining the position $P_i$ (110) in the space corresponding to the pixel $p_i$ (112) of the input image 103 will be described. Hereinafter, two methods will be described as examples, but other methods may be used.

The first method is a method of obtaining the position $P_i$ (110) in the space corresponding to the pixel $p_i$ (112) of the input image by using depth data at a viewpoint of the reference image 104. Note that as the depth data, it is possible to use either a sparse depth map obtained from feature points or the like, or a dense depth map obtained by a stereo method or the like.

The depth data can be acquired, for example, by using a red, green, blue, and depth (RGB-D) camera as a camera for acquiring the reference image 104.

Furthermore, for example, the depth data may be created by mounting a sensor such as light detection and ranging (LiDAR) capable of measuring a three-dimensional structure of surroundings on the mobile body 200a configured to acquire the reference image 104 and projecting the measured three-dimensional structure to the viewpoint of the reference image 104.

Furthermore, for example, the depth data may be acquired by combining a plurality of images capturing the same object as an object in the reference image 104 and applying SfM and a multi-view stereo method or the like.

Furthermore, for example, the depth data may be estimated from the reference image 104 by a neural network or the like.

Figure 8:
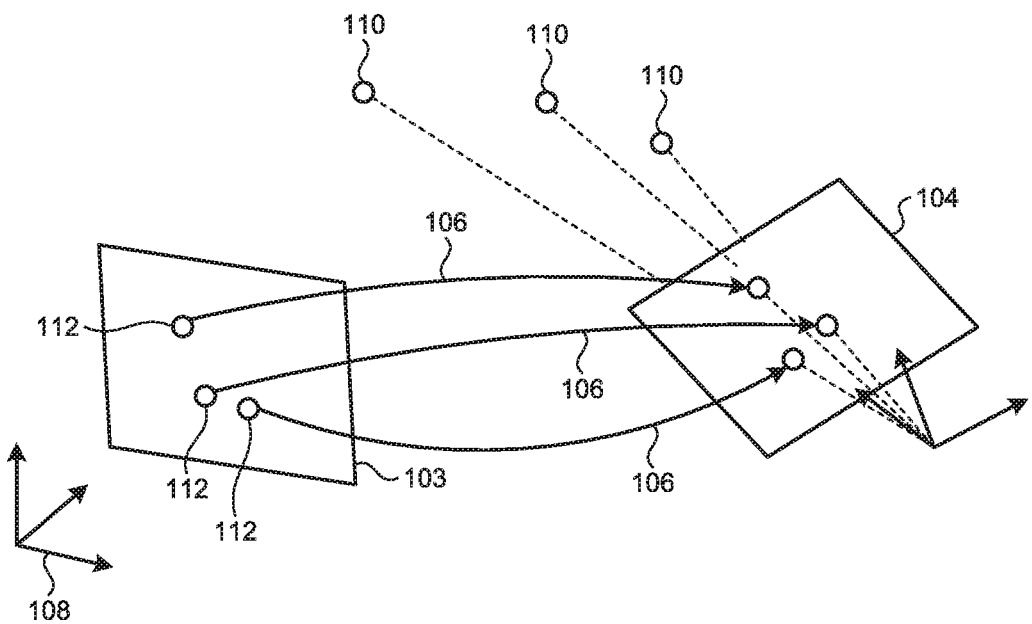
FIG. 8 is a diagram illustrating a method of determining a position in a space corresponding to a pixel of an input image according to the first embodiment.

FIG. 8 is a diagram illustrating a method of determining the position $P_i$ (110) in the space corresponding to the pixel $p_i$ (112) of the input image 103 according to the first embodiment. As illustrated in FIG. 8, the location calculator 15 obtains the pixels of the reference image 104 corresponding to the pixel $p_i$ (112) of the input image 103 by the correspondence 106. Then, the location calculator 15 determines the position $P_i$ (110) in the space by using the depth data in the pixel of the reference image 104.

Specifically, the location calculator 15 determines the position $P_i$ (110) from the position and the orientation of the camera 101a when the reference image 104 is captured, the internal parameters of the camera 101a, and the depth data, according to the following equations (2) and (3).

$$P_{i,R} = d_i v(C(P_i)) \quad (2)$$

$$P_i = T_R P_{i,R} \quad (3)$$

Here, C ($p_i$) represents the position of the reference image 104 corresponding to the pixel $p_i$ of the input image 103. v (C ($p_i$)) is a unit vector representing a direction of a light ray corresponding to a pixel C ($p_i$) of the reference image 104 and is obtained from the internal parameters of the camera. $d_i$ is a distance from a viewpoint from which the reference image 104 is captured to the position $P_i$ (110) and obtained from the depth data. That is, $P_{i,R}$ is coordinates representing the coordinates in the space corresponding to the pixel $p_i$ on the basis of a coordinate system of the reference image 104. Furthermore, $T_R$ represents a conversion from the coordinate system of the reference image 104 to the reference coordinate system. $T_R$ is obtained from the position and the orientation of the reference image 104.

Note that in a case where sparse depth data is used, as for a pixel for which depth is not defined, a position in the space cannot be obtained. However, the number of points necessary for the location estimation is generally small, and for example, the translation and the rotation in the three-dimensional space can be determined by four or more points. Therefore, the sparse depth data can also be used.

The second method is a method of obtaining the position $P_i$ (110) in the space corresponding to the pixel $p_i$ (112) of the input image 103 by using a plurality of reference images 104. In a case where the plurality of reference images 104 is used, the location calculator 15 obtains a point corresponding to the pixel 112 of the input image 103 for each reference image 104. Then, the location calculator 15 determines the position $P_i$ (110) of the point in the space by triangulating from the obtained point. In a case where the second method is used, it is not necessary to have the depth data associated with the reference image 104.

Note that the location calculator 15 may determine the position $P_i$ (110) in the space by a combination of a plurality of methods such as the first method and the second method described above.

Furthermore, the location calculator 15 may perform weighting for each pixel to minimize a weighted reprojection error defined by the following equation (4).

$$E = \sum_i w_i \| p_i - \pi(P_i, T) \|^2 \quad (4)$$

Here, $w_i$ is a weighting coefficient for each pixel. For example, it is possible to use the degree of similarity calculated by the degree-of-similarity calculator 13 as the weighting coefficient $w_i$. Specifically, the location calculator 15 assigns a larger weight to a point calculated from the reference image 104 with a higher degree of similarity and assigns a smaller weight to a point calculated from a reference image with a lower degree of similarity. As the degree of similarity is higher, the accuracy of the correspondence tends to be higher. Therefore, the accuracy of the location can be enhanced by emphasizing such highly accurate correspondence.

Furthermore, for example, the location calculator 15 may determine the weighting coefficient $w_i$ by using the evaluation value of the correspondence calculated by the correspondence calculator 14.

Furthermore, for example, in a case where the degree-of-similarity calculator 13 and the correspondence calculator 14 or the like include the neural network, the location calculator 15 may use, as the weighting coefficient $w_i$, information on a hidden layer of the neural network included in the degree-of-similarity calculator 13 and the correspondence calculator 14 or the like.

Furthermore, for example, the location calculator 15 may determine the weighting coefficient $w_i$ by combining a plurality of weights based on the degree of similarity and weights based on the degree of reliability of the correspondence.

Furthermore, for example, the location calculator 15 may estimate the position of the first location 108 by using only a part of the correspondence between the pixels. For example, an outlier may be removed by least median of squares (LMedS), random sample consensus (RANSAC) or the like. With such a configuration, even in a case where the outlier is included in the correspondence relationship, the location estimation can be performed robustly.

Step S106

The degree-of-reliability calculator 16 evaluates the degree of reliability of the first location 108 calculated by the location calculator 15 from the degree of similarity between the input image 103 and the reference image 104 and the correspondence 106 between the pixel of the input image 103 and the pixel of the reference image 104.

First, an evaluation based on the degree of similarity will be described. As described above in the description of the degree-of-similarity calculator 13, as the degree of similarity between the input image 103 and the reference image 104 is higher, the estimation accuracy of the first location 108 is expected to be higher. Therefore, the degree-of-reliability calculator 16 makes the degree of reliability higher as the degree of similarity is higher.

Next, an evaluation based on the correspondence 106 between the pixels will be described. As an example of an evaluation method, it is possible to use the reprojection error at the first location 108 that is estimated. When the first location 108 can be accurately estimated, the reprojection error is expected to become small in most pixels. Therefore, the degree-of-reliability calculator 16 calculates the degree of reliability of the first location 108 to be higher as the above-described pixel distance is closer. Specifically, the degree-of-reliability calculator 16 can evaluate the degree of reliability by using, for example, an average of the reprojection errors 109 (the above-described pixel distance). Furthermore, for example, the degree-of-reliability calculator 16 may obtain a sum after applying a function such as a sigmoid function to the reprojection error. For example, the degree-of-reliability calculator 16 may weight the reprojection error according to the degree of reliability of the correspondence 106 and the degree of similarity between the input image 103 and the reference image 104 or the like.

Furthermore, for example, the degree-of-reliability calculator 16 may evaluate the degree of reliability by using a differential value of the reprojection error. That is, if a correspondence relationship that facilitates to perform the location estimation is obtained, the reprojection error becomes lower at a correct location and is supposed to sharply increase as the location is gradually changed from the correct location. The degree-of-reliability calculator 16 can evaluate the uncertainty of the reprojection error by evaluating a degree of this change by using the differential value of the reprojection error concerning the location, for example, a Jacobian matrix or a Hessian matrix.

The degree of reliability of the first location 108 is defined by considering these two criteria (the evaluation by the degree of similarity and the evaluation by the correspondence 106 between the pixels). Specifically, the degree of reliability of the first location 108 is defined, for example, by a product and a sum of the evaluation based on the degree of similarity and the evaluation based on the correspondence 106.

As described above, in the location estimating apparatus 1 according to the first embodiment, the input image receiver 11 receives, as the input image 103, the image captured by the first imaging device attached to the mobile body. The reference data receiver 12 receives the reference data in which the reference image 104 captured by the second imaging device (camera 101*a*) and the position and the orientation of the second imaging device when the reference image 104 is captured. The degree-of-similarity calculator 13 calculates the degree of similarity between the input image 103 and the reference image 104 by the arithmetic operation that varies, in a non-discrete manner, the degree of similarity in accordance with the non-discrete variations of the first parameter. The correspondence calculator 14 calculates the correspondence 106 between the pixel of the input image 103 and the pixel of the reference image 104 by an arithmetic operation that varies, in a non-discrete manner, the correspondence 106 in accordance with the non-discrete variations of the second parameter. The location calculator 15 calculates the first location 108 indicating at least one of the position and the orientation of the first imaging device when the input image 103 is captured by an arithmetic operation that varies, in a non-discrete manner, the first location 108 in accordance with the non-discrete variations of the correspondence 106. Then, the degree-of-reliability calculator 16 calculates the degree of reliability of the first location 108 by the arithmetic operation that varies, in a non-discrete manner, the degree of reliability in accordance with the non-discrete variations of the first location 108, the correspondence 106, and the degree of similarity.

Thus, with the location estimating apparatus 1 according to the first embodiment, it is possible to further improve the estimation accuracy of the location of the camera at the time of imaging. Specifically, the location estimating apparatus 1 according to the first embodiment estimates the first location 108 and the degree of reliability for the parameter (the input image 103, the reference image 104, and the variable of the processing or the like) that influences an arithmetic operation result, by a combination of the non-discrete (continuous) arithmetic operations. Therefore, for example, when a parameter defining the method of calculating the degree of similarity (for example, a method of acquiring a feature point of an image), an imaging condition of the input image 103, and an imaging condition of the reference image 104 are slightly changed, the first location 108 and the degree of reliability also slightly change and do not change in a discrete manner. Therefore, by gradually varying the parameter, it is possible to make the first location 108 and the degree of reliability to be output close to desired values. Therefore, the operation of the location estimating apparatus 1 can be adapted in accordance with a target scene, and the accuracy of the location estimation can be enhanced.

Meanwhile, in a conventional location estimating apparatus, since discrete (non-continuous) processing is included, the operation of location estimation cannot be adapted to a target scene. For example, in a case where the processing of extracting a feature point from a captured image and the processing of determining a feature point in a database corresponding to the extracted feature point or the like are included as discrete (non-continuous) processing, if a parameter of the processing is changed, a searched image and an extracted position of a feature point change in a discrete manner. As a result, an output location of the camera changes in a discrete manner.

Furthermore, in the conventional location estimating apparatus, when an input image and an imaging condition of an image stored in a database (for example, a relative position and a relative orientation with respect to a mobile body and the zoom of a camera) are gradually changed, since a result of the above-described processing also changes in a discrete manner, an output location of the camera changes in a discrete manner.

When the location estimation of the camera is performed in a specified scene (a building and an area or the like), it is desirable to optimize a parameter of the arithmetic processing (for example, the imaging condition of the image) according to the scene in order to enhance the accuracy and robustness. However, as described above, in the conventional location estimating apparatus, when the parameter is changed, an estimated location of the camera changes in a discrete manner. Therefore, it cannot be determined how the parameter for the arithmetic operation is varied to optimize the accuracy of the location estimation. Therefore, in the conventional location estimating apparatus, the operation of the location estimation cannot be adapted to the target scene.

Meanwhile, the location estimation processing of the location estimating apparatus 1 according to the first embodiment does not include discrete (non-continuous) processing. Therefore, with the location estimating apparatus 1 according to the first embodiment, since the operation of the location estimating apparatus 1 can be adapted in accordance with the target scene, the accuracy of the location estimation can be further enhanced.

With the location estimating apparatus 1 according to the first embodiment, when a parameter defining the location estimating method and the imaging condition of the image or the like continuously varies, the location and the degree of reliability continuously vary and therefore, various parameters can be adjusted such that the accuracy and the degree of reliability of the location are enhanced.

Second Embodiment

Next, a second embodiment will be described. In the description of the second embodiment, description similar to that of the first embodiment will be omitted.

Example of Functional Configuration

Figure 9:
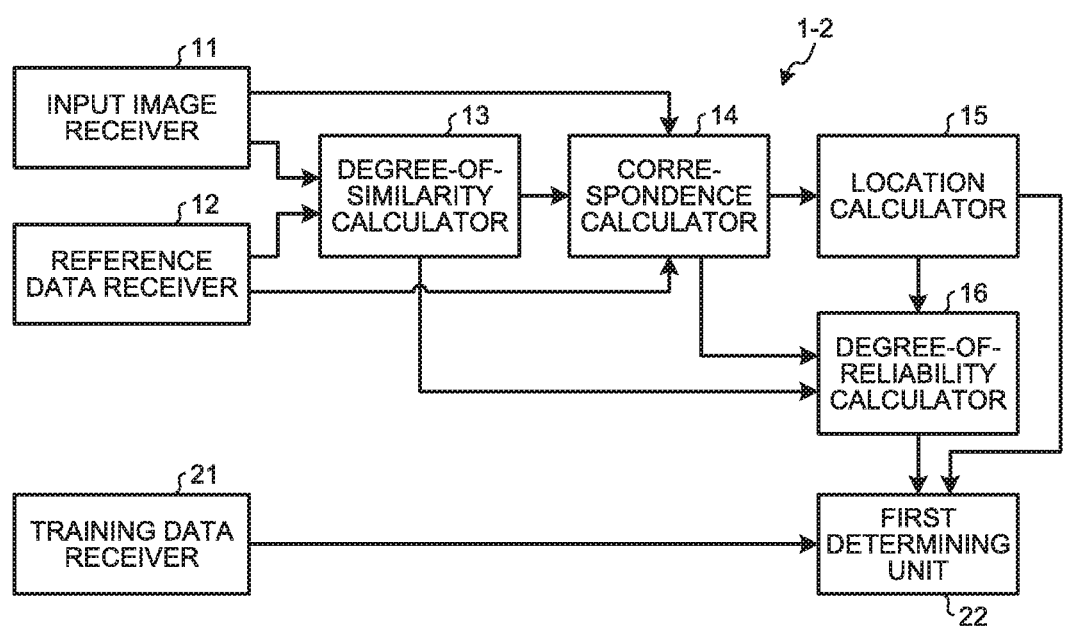
FIG. 9 is a diagram illustrating an example of a functional configuration of a location estimating apparatus according to a second embodiment.

FIG. 9 is a diagram illustrating an example of a functional configuration of a location estimating apparatus 1-2 according to the second embodiment. The location estimating apparatus 1-2 according to the second embodiment is different from the location estimating apparatus 1 according to the first embodiment in that the location estimating apparatus 1-2 has a function of determining an imaging condition of an input image 103 in order to maximize a degree of reliability of location estimation. Here, the imaging condition includes a condition relating to an optical system such as a focal length and zoom, and a relative position and a relative orientation of an imaging device with respect to a mobile body.

The location estimating apparatus 1-2 according to the second embodiment includes an input image receiver 11, a reference data receiver 12, a degree-of-similarity calculator 13, a correspondence calculator 14, a location calculator 15, a degree-of-reliability calculator 16, a training data receiver 21, and a first determining unit 22. Since the operations of the input image receiver 11, the reference data receiver 12, the degree-of-similarity calculator 13, the correspondence calculator 14, the location calculator 15, and the degree-of-reliability calculator 16 are the same as those in the first embodiment, the description thereof will be omitted.

The training data receiver 21 is configured to receive, as training data, a second location indicating at least one of a position and an orientation of a first imaging device at the time of capturing the input image 103.

The first determining unit 22 is configured to determine a first imaging condition such that a first location 108 approaches a second location. The first imaging condition includes at least one of, for example, a focal length of the first imaging device, the focus of the first imaging device, the zoom of the first imaging device, the position of the first imaging device, and the orientation of the first imaging device.

A method of using the first imaging condition may be any method. The imaging condition of the first imaging device may be controlled, for example, by the first determining unit 22 inputting the determined first imaging condition to the first imaging device. Furthermore, for example, the first determining unit 22 may prompt a change of the imaging condition of the first imaging device by presenting the determined first imaging condition to a user via a user interface such as a display unit.

Furthermore, the first determining unit 22 may determine the first imaging condition without using the training data. For example, the first determining unit 22 may determine the first imaging condition of the first imaging device such that the degree of reliability of the first location 108 becomes higher.

Figure 10:
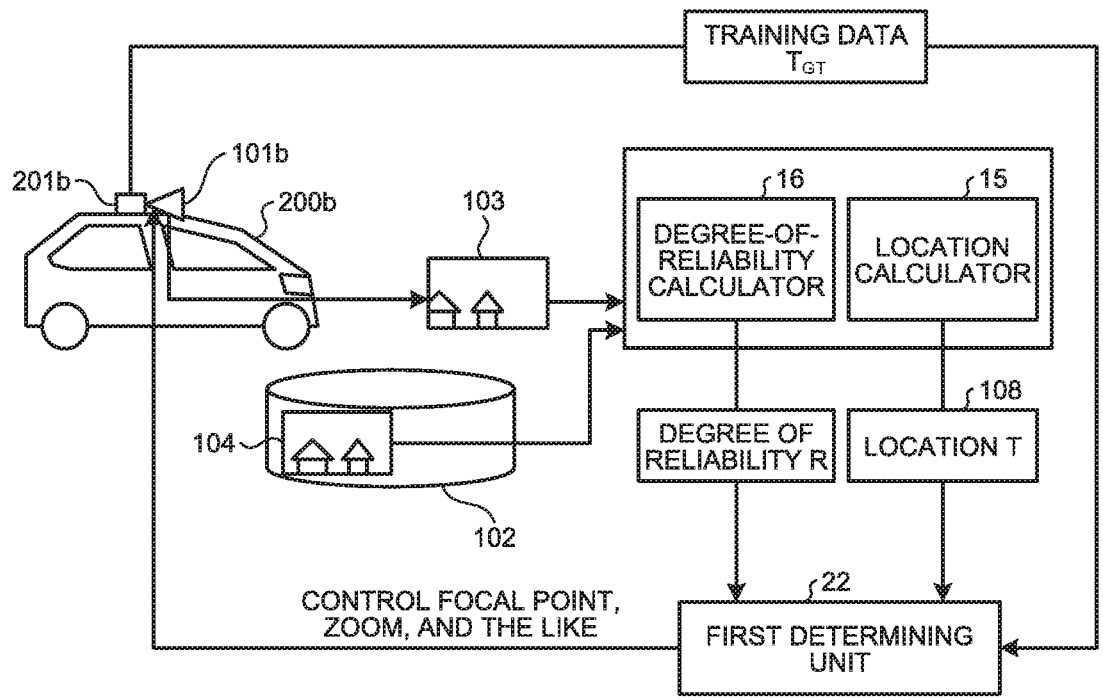
FIG. 10 is a diagram illustrating an example of operation of a first determining unit according to the second embodiment.

FIG. 10 is a diagram illustrating an example of operation of the first determining unit 22 according to second embodiment. The training data receiver 21 is configured to receive the position and the orientation of a camera 101b (first imaging device) at the time of capturing the input image 103 by a method similar to the method of step S102 in the first embodiment. The first determining unit 22 determines the first imaging condition (such as a focal point and the zoom) such that the degree of reliability calculated by the degree-of-reliability calculator 16 becomes higher and to input the first imaging condition to the camera 101b.

Since location estimation processing by the location estimating apparatus 1-2 includes continuous arithmetic operations, it is possible to obtain a differential coefficient by differentiating the degree of reliability by a parameter that determines the first imaging condition (for example, a focal length and the zoom of a camera). This differential coefficient may be obtained by using the chain rule of differentiation. Alternatively, after slightly varying a condition, the acquisition of the input image 103, the location estimation, and the calculation of the degree of reliability are performed again, and then an evaluation may be performed by dividing a difference with the degree of reliability before a variation by a magnitude of the variation.

When the differential coefficient with respect to a certain value is positive, the degree of reliability can be increased by increasing the value. Meanwhile, when the differential coefficient is negative, the value only needs to be decreased. Furthermore, the magnitude of the increase (decrease) may be made proportional to an absolute value of the differential coefficient or an upper limit may be set for a range of variations to avoid a sudden variation.

Specifically, in order to apply the first imaging condition, for example, for the focal length and the zoom of the camera, a mechanism such as autofocus and electric zooming can be used. Furthermore, in order to control a relative position and a relative orientation between the camera 101b and the mobile body 200a, the camera 101b is mounted on a camera platform capable of controlling the position and the orientation to control the camera platform. Furthermore, an instruction on variations of the first imaging condition may be transmitted to the user through a display, voice, or the like, and the user may apply the variations on the basis of the transmitted instruction.

In addition, the first determining unit 22 may determine the first imaging condition such that a first location T (108) output by the location calculator 15 approaches the training data $T_{GT}$ (the position and the orientation) received by the training data receiver 21 (sensor 201b). Since the location estimation processing by the location estimating apparatus 1-2 includes the continuous arithmetic operations, an output position and an output orientation can be differentiated by each parameter, and the variations of the first imaging condition can be determined by the above-described method.

As described above, with the location estimating apparatus 1-2 according to the second embodiment, it is possible to determine the imaging condition (first imaging condition) of the input image 103 for enhancing the degree of reliability of the location estimation. According to the second embodiment, it is possible to further improve the accuracy of the location estimation by adapting the camera 101b (first imaging device) configured to capture the input image 103 to a target scene.

Third Embodiment

Next, a third embodiment will be described. In the description of the third embodiment, description similar to that of the first or second embodiment will be omitted.

Example of Functional Configuration

Figure 11:
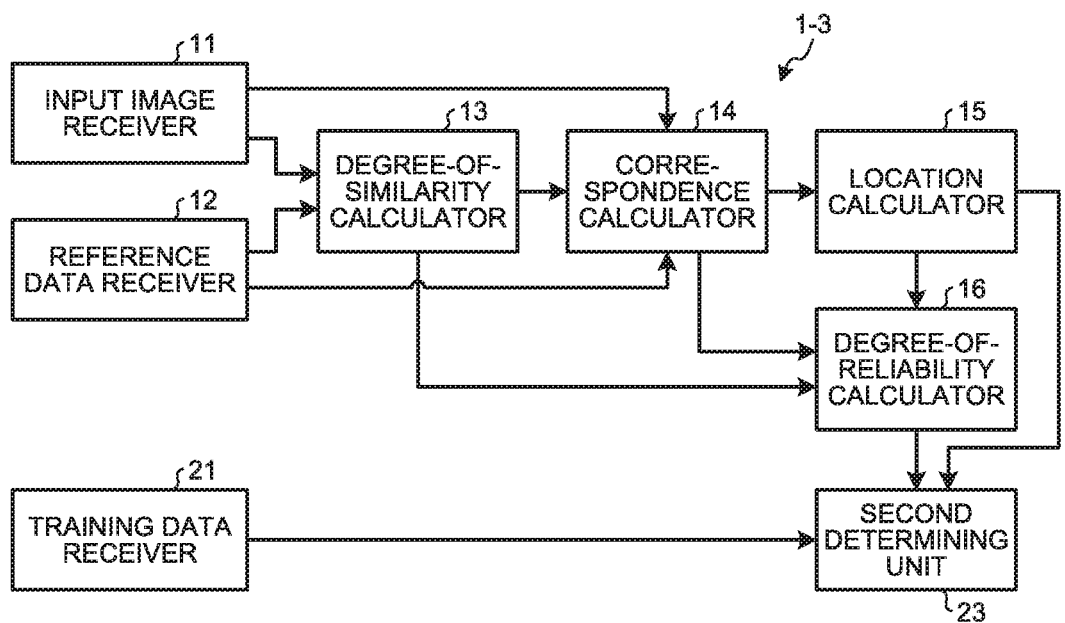
FIG. 11 is a diagram illustrating an example of a functional configuration of a location estimating apparatus according to a third embodiment.

FIG. 11 is a diagram illustrating an example of a functional configuration of a location estimating apparatus 1-3 according to the third embodiment. The location estimating apparatus 1-3 according to the third embodiment is different from the location estimating apparatus 1 according to the first embodiment in that the location estimating apparatus 1-3 has a function of determining an imaging condition of a reference image 104 in order to maximize a degree of reliability of location estimation for an input image 103. Here, the imaging condition includes a condition relating to an optical system such as a focal length and zoom, and a relative position and a relative orientation of an imaging device with respect to a mobile body.

The location estimating apparatus 1-3 according to the third embodiment includes an input image receiver 11, a reference data receiver 12, a degree-of-similarity calculator 13, a correspondence calculator 14, a location calculator 15, a degree-of-reliability calculator 16, a training data receiver 21, and a second determining unit 23. Since the operations of the input image receiver 11, the reference data receiver 12, the degree-of-similarity calculator 13, the correspondence calculator 14, the location calculator 15, and the degree-of-reliability calculator 16 are the same as those in the first embodiment, the description thereof will be omitted.

The training data receiver 21 is configured to receive, as training data, a second location indicating at least one of a position and an orientation of a first imaging device at the time of capturing the input image 103.

The second determining unit 23 is configured to determine a second imaging condition such that the first location 108 approaches the second location. The second imaging condition includes at least one of, for example, a focal length of the second imaging device, the focus of the second imaging device, the zoom of the second imaging device, a position of the second imaging device, and an orientation of the second imaging device.

Furthermore, the second determining unit 23 may determine the second imaging condition without using the training data. For example, in a case where the training data is not used, the second determining unit 23 is configured to determine the second imaging condition of the second imaging device (camera 101a) such that the degree of reliability of the first location 108 becomes higher.

Figure 12:
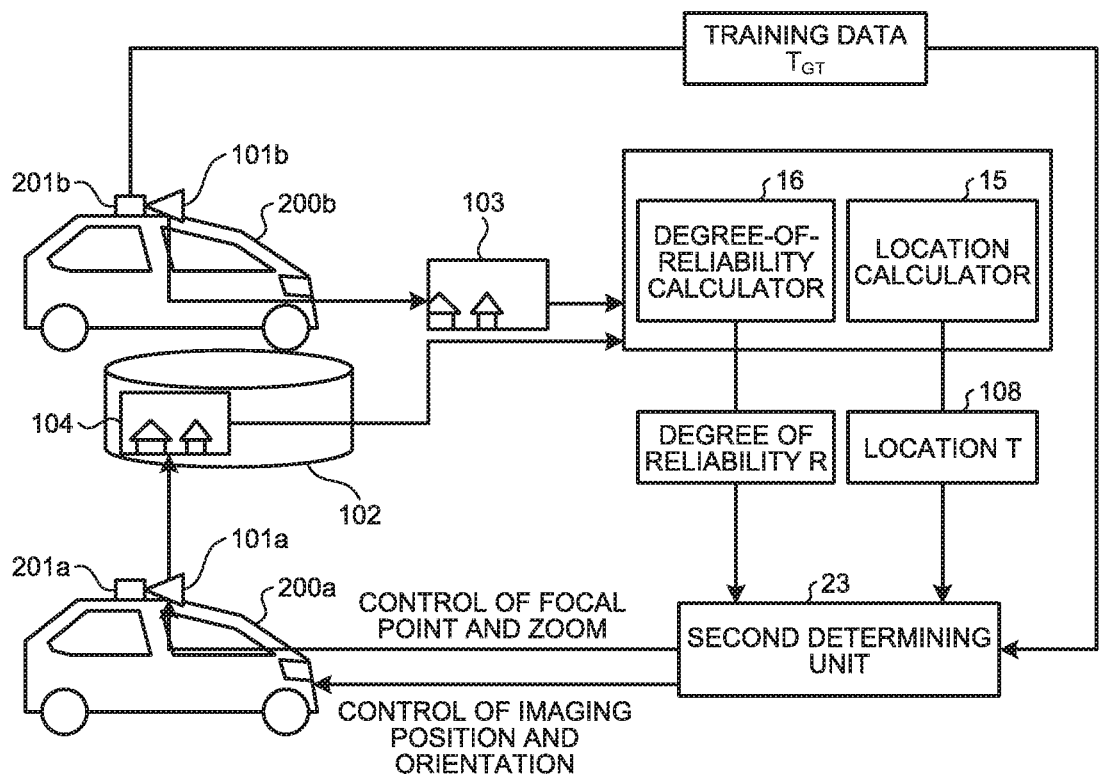
FIG. 12 is a diagram illustrating an example of operation of a second determining unit according to the third embodiment.

FIG. 12 is a diagram illustrating an example of operation of the second determining unit 23 according to third embodiment. Since location estimation processing by the location estimating apparatus 1-3 includes continuous arithmetic operations, it is possible to differentiate the degree of reliability by a parameter that determines an imaging condition of the second imaging device (for example, a focal length and the zoom of a camera) and obtain a differential coefficient. By using this differential coefficient and performing control similar to the control described in the second embodiment, it is possible to control the camera 101a (second imaging device) such that the degree of reliability becomes higher.

The second determining unit 23 is configured to receive the position and the orientation of a camera 101b (first imaging device) when the input image 103 is captured from the training data $T_{GT}$ (the position and the orientation) received by the training data receiver 21 (sensor 201b). Then, the second determining unit 23 is configured to determine the second imaging condition such that the first location T (108) output by the location calculator 15 approaches the acquired position and orientation. As a method of controlling the camera 101a (second imaging device) using the second imaging condition, a method similar to the method in the second embodiment can be used.

Next, a method of controlling the second imaging condition will be described specifically. Here, a case where the camera 101a is installed on a mobile body 200a and the mobile body 200a is moved to acquire the reference image 104 is exemplified. At this time, a positional relationship of the camera 101a with the mobile body 200a, such as the zoom and a focal point of the camera 101a can be adjusted by a method similar to the method in the second embodiment. Furthermore, an imaging position can be adjusted by moving the mobile body 200a. This movement of the mobile body 200a may be performed autonomously or an instruction of a moving direction and a distance or the like may be instructed to a user via a display or the like and the user may move the mobile body 200a in accordance with the instruction.

As described above, with the location estimating apparatus 1-3 according to the third embodiment, it is possible to determine the imaging condition (second imaging condition) of the reference image 104 for enhancing the accuracy of the location estimation. According to the third embodiment, it is possible to improve the accuracy of the location estimation by constructing a database of the reference image from the image adapted to the target scene.

Fourth Embodiment

Next, a fourth embodiment will be described. In the fourth embodiment, a learning apparatus 2 configured to learn a parameter of a degree-of-similarity calculator 13 (first parameter) will be described. By using a parameter learned by the learning apparatus 2, it is possible to adapt the parameter of the degree-of-similarity calculator 13 to a scene to be subjected to location estimation.

Note that the learning apparatus 2 may be achieved by hardware different from that of the location estimating apparatus 1 or may be incorporated in the location estimating apparatus 1 as a learning unit.

Example of Functional Configuration

Figure 13:
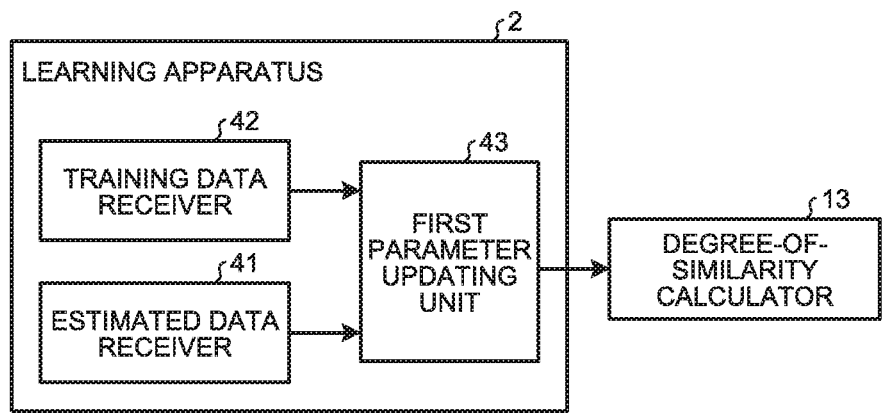
FIG. 13 is a diagram illustrating an example of a functional configuration of a learning apparatus according to a fourth embodiment.

FIG. 13 is a diagram illustrating an example of a functional configuration of the learning apparatus 2 according to the fourth embodiment. The learning apparatus 2 according to the fourth embodiment includes an estimated data receiver 41, a training data receiver 42, and a first parameter updating unit 43.

The estimated data receiver 41 is configured to receive estimated data including a first location 108 and a degree of reliability from the location estimating apparatus 1.

The training data receiver 42 is configured to receive, as training data, a second location indicating at least one of a position and an orientation of a camera 101b (first imaging device) at the time of capturing an input image 103.

The first parameter updating unit 43 is configured to update a first parameter such that the degree of reliability becomes higher as a difference between the first location 108 and the second location is smaller.

Figure 14:
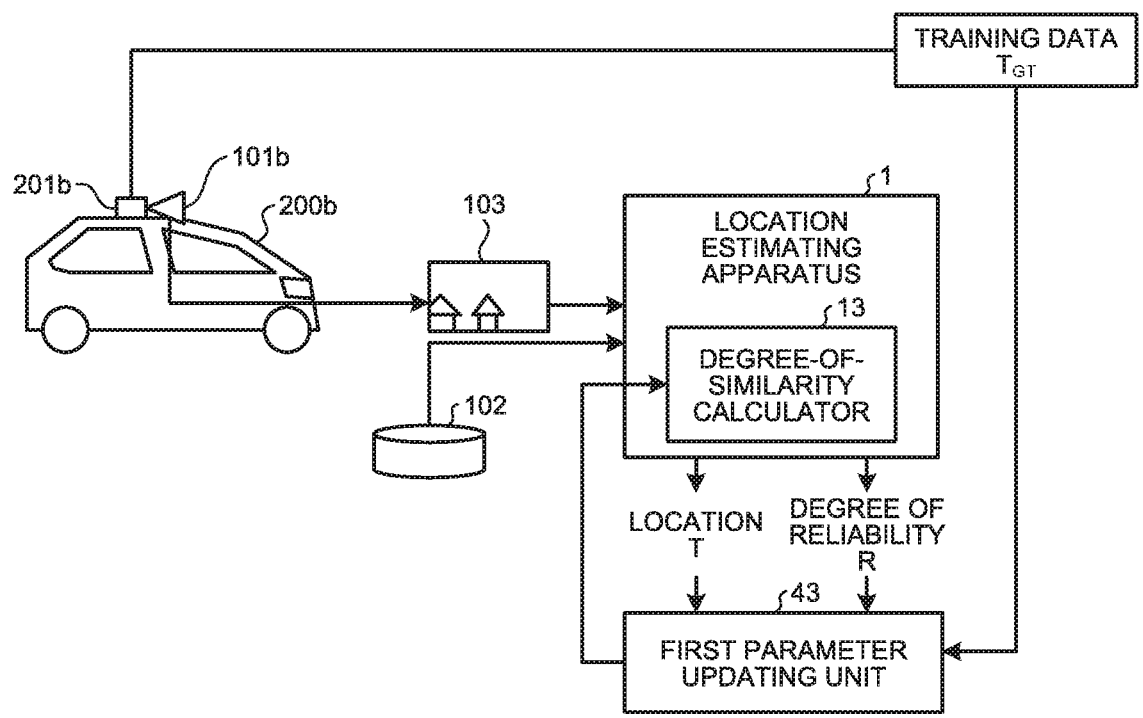
FIG. 14 is a diagram illustrating an example of operation of a first parameter updating unit according to fourth embodiment.

FIG. 14 is a diagram illustrating an example of operation of the first parameter updating unit 43 according to fourth embodiment. The estimated data receiver 41 is configured to receive estimated data including a location T (the first location 108) and a degree of reliability R calculated from the input image 103 by the location estimating apparatus 1 according to the first embodiment (or the location estimating apparatus 1-2 according to the second embodiment).

The training data receiver 42 is configured to receive, as the second location, the position and the orientation of the camera 101b at the time of capturing the input image 103. Specifically, the second location is acquired by a method similar to the method of step S102 in the first embodiment.

The first parameter updating unit 43 is configured to update the first parameter such that the degree of reliability becomes higher as the first location calculated by the location calculator 15 is closer to the training data $T_{GT}$ (second location) (such that the degree of reliability becomes lower as the first location calculated by the location calculator 15 is farther from the training data $T_{GT}$ (second location)).

Specifically, the first parameter updating unit 43 is configured to update the first parameter, for example, such that a loss function L as expressed by the following equation (5) is minimized.

$$L = R(\|T - T_{GT}\| - \delta) \quad (5)$$

Here, T represents the estimated first location 108, $T_{GT}$ represents the training data (second location), and R represents the estimated degree of reliability. $\delta$ is a threshold value. A difference between T and $T_{GT}$ in the equation represents a difference of the location expressed by any method. For example, in a case where a position in a three-dimensional space is expressed by coordinates in the three-dimensional space and an orientation in the three-dimensional space is expressed by a quaternion representing a rotation in the three-dimensional space, it is possible to use a combination of a difference in the coordinates and a difference in the quaternions in the three-dimensional space. Furthermore, a relative location from the estimated location T (the first location 108) to the training data $T_{GT}$ may be obtained and what is obtained by evaluating a degree of deviation from an origin point by the above-described method may be used. In a case where an error is larger than $\delta$, the loss function L becomes smaller as R is smaller, whereas in a case where the error is smaller than $\delta$, the loss function L becomes smaller as R is larger.

Since estimation processing of the first location 108 by the location estimating apparatus 1 includes continuous arithmetic operations, it is possible to differentiate the loss function L by the first parameter of the degree-of-similarity calculator 13 and determine a direction in which the loss function L is decreased. By repeatedly varying the first parameter in the determined direction, the degree of similarity between the input image 103 and the reference image 104 that increases an error of the location estimation becomes smaller. On the other hand, the degree of similarity between the input image 103 and the reference image 104 that reduces the error of the location estimation becomes larger. By using the degree-of-similarity calculator 13 updated in this way, the reference image 104 that reduces the error of the location estimation is preferentially used for the location estimation.

In addition, the loss function L described above also has a function of minimizing an error between the first location 108 that is estimated and the training data $T_{GT}$ (second location). Therefore, in a case where the location calculator 15 is configured to use the degree of similarity for estimation of the location, the accuracy of the location can also be improved at the same time. That is, by using the loss function L described above, the first parameter updating unit 43 can update the first parameter such that the difference between the first location 108 and the second location becomes smaller.

As described above, with the learning apparatus 2 of the fourth embodiment, it is possible to adapt the degree-of-similarity calculator 13 of the location estimating apparatus 1 to a scene to be subjected to the location estimation and use the reference image 104 that reduces the error of location estimation. Therefore, it is possible to improve the accuracy of the location estimation.

Fifth Embodiment

Next, a fifth embodiment will be described. In the fifth embodiment, a learning apparatus 2-2 configured to learn a parameter of a correspondence calculator 14 (second parameter) will be described. By using a parameter learned by the learning apparatus 2-2, it is possible to adapt the parameter of the correspondence calculator 14 to a scene to be subject to location estimation.

Note that the learning apparatus 2-2 may be achieved by hardware different from that of a location estimating apparatus 1 or may be incorporated in the location estimating apparatus 1 as a learning unit.

Example of Functional Configuration

Figure 15:
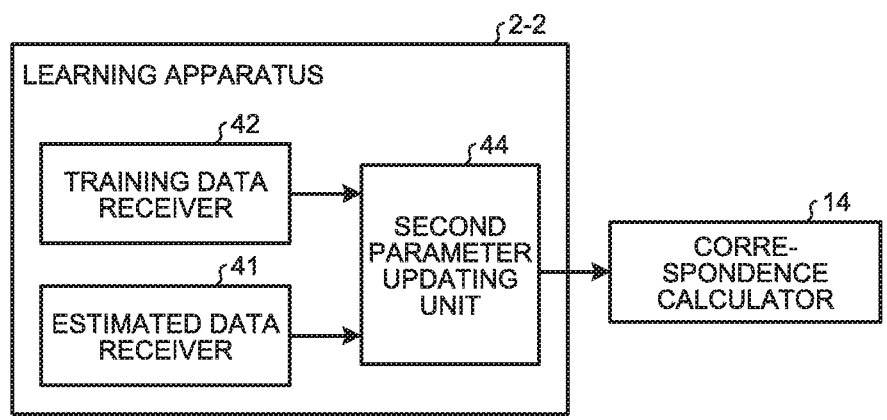
FIG. 15 is a diagram illustrating an example of a functional configuration of a learning apparatus according to a fifth embodiment.

FIG. 15 is a diagram illustrating an example of a functional configuration of the learning apparatus 2-2 according to the fifth embodiment. The learning apparatus 2-2 according to the fifth embodiment includes an estimated data receiver 41, a training data receiver 42, and a second parameter updating unit 44. Since the operation of the estimated data receiver 41 and the operation of the training data receiver 42 are the same as those in the fourth embodiment, the description thereof will be omitted.

Figure 16:
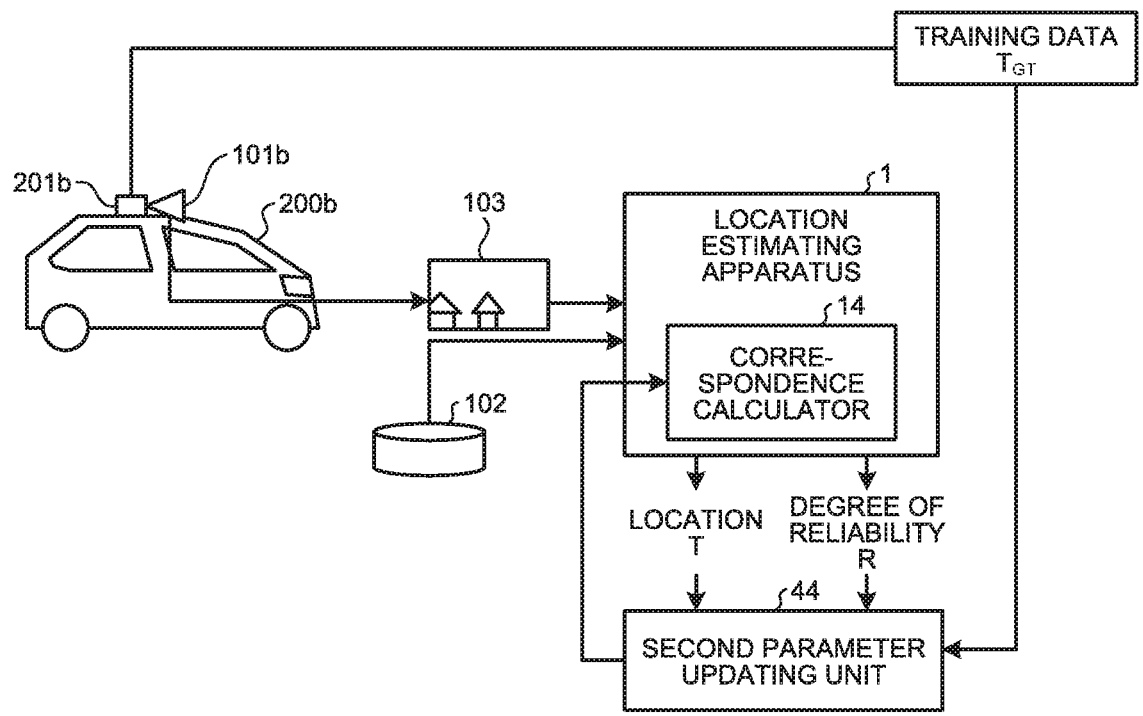
FIG. 16 is a diagram illustrating an example of operation of a second parameter updating unit according to the fifth embodiment.

FIG. 16 is a diagram illustrating an example of operation of the second parameter updating unit 44 according to the fifth embodiment. The second parameter updating unit 44 is configured to update the second parameter such that a degree of reliability becomes higher as a difference between a first location 108 and training data $T_{GT}$ (second location) is smaller. Furthermore, the second parameter updating unit 44 is further configured to update the second parameter so as to reduce the difference between the first location 108 and the training data $T_{GT}$ (second location).

Specifically, the second parameter can be updated so as to decrease the loss function L described in the fourth embodiment. The loss function L weights a difference between the first location 108 that is estimated (calculated) by degree of similarity and the training data $T_{GT}$ (second location). Therefore, it is possible to reduce an influence of data that has a low degree of similarity and with which the location estimation is in principle impossible on learning.

The estimation processing of the first location 108 by the location estimating apparatus 1 includes continuous arithmetic operations. Therefore, as with the fourth embodiment, by using the chain rule in differential calculus, it is possible to differentiate the loss function L by the second parameter and determine a direction in which the second parameter varies, the direction in which the loss function L is decreased. As a result, the second parameter that makes it possible to estimate the location with higher accuracy is obtained.

As described above, with the learning apparatus 2-2 according to the fifth embodiment, it is possible to adapt the correspondence calculator 14 to a scene to be subjected to the location estimation and calculate correspondence 106 with higher accuracy. Therefore, it is possible to improve the accuracy of the location estimation.

Finally, an example of a hardware configuration of the location estimating apparatus 1 (1-2 and 1-3) according to the first to third embodiments and the learning apparatus 2 (2-2) according to the fourth and fifth embodiments will be described.

Exemplary Hardware Configuration

Figure 17:
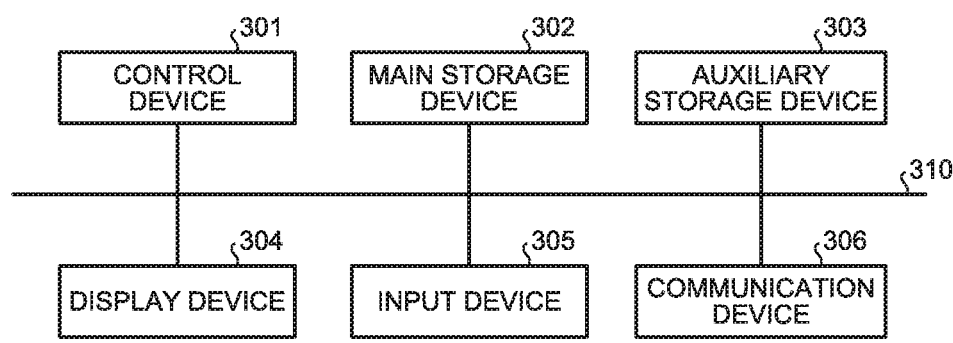
FIG. 17 is a diagram illustrating an example of a hardware configuration of the location estimating apparatuses according to the first to third embodiments and the learning apparatuses according to the fourth and fifth embodiments.

FIG. 17 is a diagram illustrating the example of the hardware configuration of the location estimating apparatuses 1 (1-2 and 1-3) according to the first to third embodiments and the learning apparatuses 2 (2-2) according to the fourth and fifth embodiments. Hereinafter, the case of the location estimating apparatus 1 according to the first embodiment will be described as an example.

The location estimating apparatus 1 according to the first embodiment includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected via a bus 310.

The control device 301 is configured to execute a program read from the auxiliary storage device 303 to the main storage device 302. The main storage device 302 is a memory such as a read only memory (ROM) and a random access memory (RAM). The auxiliary storage device 303 is a hard disk drive (HDD) and a memory card or the like.

The display device 304 is configured to displays display information. The display device 304 is, for example, a liquid crystal display. The input device 305 is an interface for operating the location estimating apparatus 1. The input device 305 is, for example, a keyboard and a mouse. In a case where the location estimating apparatus 1 is a smart phone or a smart device such as a tablet terminal, the display device 304 and the input device 305 are, for example, of a touch panel. The communication device 306 is an interface for communicating with other devices.

The program executed by the location estimating apparatus 1 according to the first embodiment is a file in an installable format or in an executable format, recorded on a computer-readable recording medium such as a compact disc read only memory (CD-ROM), a memory card, a compact disc-recordable (CD-R), and a digital versatile disc (DVD), and provided as a computer program product.

The program executed by the location estimating apparatus 1 according to the first embodiment may be stored on a computer connected to a network such as the Internet and provided by being downloaded via the network. Furthermore, the program executed by the location estimating apparatus 1 according to the first embodiment may be provided via a network such as the Internet without being downloaded.

Furthermore, the program of the location estimating apparatus 1 according to the first embodiment may be provided by being incorporated in advance in the ROM or the like.

The program executed by the location estimating apparatus 1 according to the first embodiment includes a module configuration including functional blocks achievable also by the program among the above-described functional blocks. As for each functional block as actual hardware, the control device 301 is configured to read the program from the storage medium and execute the program, whereby each of the above functional blocks is loaded on the main storage device 302. That is, each of the above functional blocks is generated on the main storage device 302.

Note that a part of or all of the above-described functional blocks may be achieved by hardware such as an integrated circuit (IC) without being achieved by software.

Furthermore, in a case where each function is achieved by using a plurality of processors, each processor may achieve one of the functions or may realize two or more of the functions.

Furthermore, an operation mode of the location estimating apparatus 1 according to the first embodiment may be any mode. The location estimating apparatus 1 according to the first embodiment may be operated, for example, as a cloud system on a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A location estimating apparatus comprising:
    an input image receiver configured to receive an input image captured by a first imaging device attached to a mobile body;
    a reference data receiver configured to receive reference data in which a reference image captured by a second imaging device is associated with a position and an orientation of the second imaging device when the reference image is captured;
    a degree-of-similarity calculator implemented by one or more hardware processors configured to calculate a degree of similarity between the input image and the reference image by an arithmetic operation that varies, in a non-discrete manner, the degree of similarity in accordance with a non-discrete variation of a first parameter;
    a correspondence calculator implemented by one or more hardware processors configured to calculate correspondence between a pixel of the input image and a pixel of the reference image by an arithmetic operation that varies, in a non-discrete manner, the correspondence in accordance with a non-discrete variation of a second parameter;
    a location calculator implemented by one or more hardware processors configured to calculate, by using the reference data, a first location indicating at least one of a position or an orientation of the first imaging device when the input image is captured by an arithmetic operation that varies, in a non-discrete manner, the first location in accordance with a non-discrete variation of the correspondence; and
    a degree-of-reliability calculator implemented by one or more hardware processors configured to calculate a degree of reliability of the first location by an arithmetic operation that varies, in a non-discrete manner, the degree of reliability in accordance with the non-discrete variations of the first location, the correspondence, and the degree of similarity.

2. The apparatus according to claim 1, further comprising a first determining unit implemented by one or more hardware processors configured to determine a first imaging condition of the first imaging device such that the degree of reliability of the first location becomes higher than the degree of reliability of the first location calculated without the first imaging condition.

3. The apparatus according to claim 2, further comprising a training data receiver configured to receive, as training data, a second location indicating at least one of the position or the orientation of the first imaging device at the time of capturing the input image,
    wherein the first determining unit is configured to determine the first imaging condition such that the first location approaches the second location.

4. The apparatus according to claim 2, wherein the first imaging condition comprises at least one of a focal length of the first imaging device, focus of the first imaging device, zoom of the first imaging device, the position of the first imaging device, or the orientation of the first imaging device.

5. The apparatus according to claim 1, further comprising a second determining unit implemented by one or more hardware processors configured to determine a second imaging condition of the second imaging device such that the degree of reliability of the first location becomes higher than the degree of reliability of the first location calculated without the second image condition.

6. The apparatus according to claim 5, further comprising a training data receiver configured to receive, as training data, the second location indicating at least one of the position or the orientation of the first imaging device at the time of capturing the input image,
wherein the second determining unit is configured to determine the second imaging condition such that the first location approaches the second location.

7. The apparatus according to claim 5, wherein the second imaging condition comprises at least one of a focal length of the second imaging device, focus of the second imaging device, zoom of the second imaging device, the position of the second imaging device, or the orientation of the second imaging device.

8. The apparatus according to claim 1, wherein the location calculator is configured to:
calculate a position in a space corresponding to a pixel of the input image by using a position in a space corresponding to a pixel of the reference image identified by the reference data and a correspondence between the pixel of the input image and the pixel of the reference image, and
calculate the first location such that a pixel distance indicating a distance between a point of the input image associated with the position in the space based at least in part on the first location and the pixel of the input image corresponding to the pixel of the reference image used for calculating the position in the space is minimized.

9. The apparatus according to claim 8, wherein the degree-of-reliability calculator is configured to calculate the degree of reliability of the first location to be higher as the pixel distance is closer.

10. The apparatus according to claim 1, wherein the degree-of-similarity calculator is configured to:
calculate, from the input image, a first feature vector indicating a feature of the input image,
calculate, from the reference image, a second feature vector indicating a feature of the reference image, and
calculate the degree of similarity to be higher as the first feature vector and the second feature vector are more similar to each other.

11. The apparatus according to claim 1, wherein
the degree-of-similarity calculator is configured to calculate the degree of similarity by a first neural network, and
the first parameter comprises a weight of the first neural network.

12. The apparatus according to claim 1, wherein
the correspondence calculator is configured to calculate the correspondence by a second neural network, and
the second parameter comprises a weight of the second neural network.

13. A learning apparatus that learns one or more parameters used in the location estimating apparatus according to claim 1, the learning apparatus comprising:

an estimated data receiver configured to receive estimated data comprising the first location and the degree of reliability from the location estimating apparatus;
a training data receiver configured to receive, as training data, a second location indicating at least one of the position or the orientation of the first imaging device at the time of capturing the input image; and
a first parameter updating unit implemented by one or more hardware processors configured to update the first parameter such that the degree of reliability becomes higher as a difference between the first location and the second location is smaller.

14. The apparatus according to claim 13, wherein the first parameter updating unit is configured to update the first parameter such that the difference between the first location and the second location becomes smaller.

15. The apparatus according to claim 13, further comprising a second parameter updating unit implemented by one or more hardware processors configured to update the second parameter such that the degree of reliability becomes higher as the difference between the first location and the second location is smaller.

16. The apparatus according to claim 15, wherein the second parameter updating unit is configured to update the second parameter such that the difference between the first location and the second location becomes smaller.

17. A location estimating method comprising:
acquiring an input image captured by a first imaging device attached to a mobile body;
acquiring reference data in which a reference image captured by a second imaging device is associated with a position and an orientation of the second imaging device when the reference image is captured;
calculating a degree of similarity between the input image and the reference image by an arithmetic operation that varies, in a non-discrete manner, the degree of similarity in accordance with a non-discrete variation of a first parameter;
calculating correspondence between a pixel of the input image and a pixel of the reference image by an arithmetic operation that varies, in a non-discrete manner, the correspondence in accordance with a non-discrete variation of a second parameter;
calculating, by using the reference data, a first location indicating at least one of a position and an orientation of the first imaging device when the input image is captured by an arithmetic operation that varies, in a non-discrete manner, the first location in accordance with a non-discrete variation of the correspondence; and
calculating a degree of reliability of the first location by an arithmetic operation that varies, in a non-discrete manner, the degree of reliability in accordance with the non-discrete variations of the first location, the correspondence and the degree of similarity.

18. The method according to claim 17, wherein the calculating the first location comprises:
calculating a position in a space corresponding to a pixel of the input image by using a position in a space corresponding to a pixel of the reference image identified by the reference data and a correspondence between the pixel of the input image and the pixel of the reference image, and
calculating the first location such that a pixel distance indicating a distance between a point of the input image associated with the position in the space based at least in part on the first location and the pixel of the input image corresponding to the pixel of the reference image used for calculating the position in the space is minimized.

19. The method according to claim 18, wherein the calculating the degree of reliability comprises calculating the degree of reliability of the first location to be higher as the pixel distance is closer.

20. The method according to claim 17 wherein the calculating the degree of similarity includes:
   calculating, from the input image, a first feature vector indicating a feature of the input image,
   calculating, from the reference image, a second feature vector indicating a feature of the reference image, and
   calculating the degree of similarity to be higher as the first feature vector and the second feature vector are more similar to each other.

21. A learning method of learning one or more parameters used in the location estimating method according to claim 17, the learning method comprising:
   acquiring estimated data comprising the first location and the degree of reliability;
   acquiring, as training data, a second location indicating at least one of the position and the orientation of the first imaging device at the time of capturing the input image; and
   updating the first parameter such that the degree of reliability becomes higher as a difference between the first location and the second location is smaller.

22. A non-transitory computer-readable medium in which programmed instructions are stored, the programmed instructions causing, when executed by a computer, the computer to perform:
   acquiring, an input image captured by a first imaging device attached to a mobile body;
   acquiring reference data in which a reference image captured by a second imaging device is associated with a position and an orientation of the second imaging device when the reference image is captured;
   calculating a degree of similarity between the input image and the reference image by an arithmetic operation that varies, in a non-discrete manner, the degree of similarity in accordance with a non-discrete variation of a first parameter;
   calculating correspondence between a pixel of the input image and a pixel of the reference image by an arithmetic operation that varies, in a non-discrete manner, the correspondence in accordance with a non-discrete variation of a second parameter;
   calculating, by using the reference data, a first location indicating at least one of a position and an orientation of the first imaging device when the input image is captured by an arithmetic operation that varies, in a non-discrete manner, the first location in accordance with a non-discrete variation of the correspondence; and
   calculating a degree of reliability of the first location by an arithmetic operation that varies, in a non-discrete manner, the degree of reliability in accordance with the continuous variations of the first location, the and the degree of similarity.

23. A non-transitory computer-readable medium in which programmed instructions for learning one or more parameters used in the non-transitory computer readable medium according to claim 22 are stored, the programmed instructions causing, when executed by a computer, the computer to perform:
   acquiring estimated data comprising the first location and the degree of reliability;
   acquiring, as training data, a second location indicating at least one of the position or the orientation of the first imaging device at the time of capturing the input image; and
   updating the first parameter such that the degree of reliability becomes higher as a difference between the first location and the second location is smaller.

* * * * *